(12) United States Patent
Desprez-le Goarant

(10) Patent No.: US 6,211,923 B1
(45) Date of Patent: Apr. 3, 2001

(54) DEVICE FOR CORRECTING THE COLOR OF A TELEVISION SIGNAL ACCORDING TO NTSC STANDARD

(75) Inventor: Yann Desprez-le Goarant, La Buisse (FR)

(73) Assignee: SGS-Thomson Microelectronics S.A., Gentilly (FR)

(*) Notice: Subject to any disclaimer, the term of this patent is extended or adjusted under 35 U.S.C. 154(b) by 0 days.

(21) Appl. No.: 08/721,179

(22) Filed: Sep. 26, 1996

(30) Foreign Application Priority Data

Sep. 29, 1995 (FR) ................................. 95 11739

(51) Int. Cl.[7] .................................................. H04N 9/64
(52) U.S. Cl. ................................. 348/654; 348/651
(58) Field of Search ................................. 348/649, 651, 348/654, 727, 639, 638, 505, 507, 642, 662, 912, 710, 711, 644, 631

(56) References Cited

U.S. PATENT DOCUMENTS

| | | | |
|---|---|---|---|
| 3,961,362 | 6/1976 | Lovely | 358/28 |
| 4,173,770 | 11/1979 | Watanabe et al. | 358/28 |
| 4,385,311 | 5/1983 | Harwood et al. | 358/28 |
| 4,463,371 | * 7/1984 | Lewis, Jr. | 358/13 |
| 4,482,916 | * 11/1984 | Acampora | 358/27 |
| 4,688,096 | * 8/1987 | Campbell, III et al. | 358/167 |
| 5,185,657 | * 2/1993 | Ozaki et al. | 358/28 |

FOREIGN PATENT DOCUMENTS 12 78 491  9/1968  (DE) ............................. H04N/34/31

* cited by examiner

Primary Examiner—Victor R. Kostak
(74) Attorney, Agent, or Firm—Wolf, Greenfield & Sacks, P.C.; James H. Morris; Theodore E. Galanthay

(57) ABSTRACT

A device corrects the chrominance parameters transmitted by a chrominance subcarrier of a television signal, by shifting the phase of two demodulation signals an angle, which depends upon the phase of the chrominance subcarrier. The demodulation signals are obtained from a phase-locked loop including a resistive and capacitive network having two outputs that differ by 90° with respect to each other. The device may include circuitry for individually shifting the phase of each signal provided by the RC network by adding to each signal a fraction of the other signal provided by the RC network. The fractional coefficients may be opposite to each other and depend upon the phase of the chrominance subcarrier.

56 Claims, 4 Drawing Sheets

DEVICE FOR CORRECTING THE COLOR OF A TELEVISION SIGNAL ACCORDING TO NTSC STANDARD

BACKGROUND OF THE INVENTION

1. Field of the Invention

The present invention relates to the correction made to the chrominance information on colors (or tones) very near that of the flesh tones, included in color television signals encoded according to NTSC standard.

2. Discussion of the Related Art

In color television signals encoded according to NTSC standard, the chrominance information is transmitted in phase quadrature modulation. The amplitude of the modulation includes the luminance information Y. The phase and amplitude of the subcarrier include the chrominance information of the considered line. The frequency of the carrier is generally either 4.43 MHz, or 3.58 MHz under the standard.

The chrominance information includes two parameters usually referred to as B-Y and R-Y which, once they are extracted from the chrominance subcarrier by demodulation, enable the receiver to restore, with the luminance signal Y, the proportion of the three primary colors of the signal, i.e., red, green, blue in the encoded color.

Phase $\psi$ of the chrominance subcarrier indicates the color to be restored. Parameter B-Y is transmitted by a subcarrier which is not shifted with respect to the carrier, i.e., by a carrier having a phase of 0°. Parameter R-Y is transmitted by a subcarrier having a phase of 90°. Parameter Y is transmitted in phase band. Colors red and blue have specific phase positions $\psi$, for example 104° and 0° respectively. All the other colors are defined by a combination of the red and blue components. For example, green is at 255° and the flesh tones is at 118°.

FIG. 1 represents the position of the primary colors (red, green, blue) and of the flesh tones in a phase diagram according to NTSC standard.

To improve color rendering, the colors are generally corrected by shifting certain phases $\psi$ of the chrominance demodulation vectors of the television signal. The correction is made in the phase half-plane centered on the flesh tones, i.e., between 28° and 208°. The primary colors blue (0°) and green (225°) therefore remain unchanged, which avoids modification of the color of the sky and grass. The most important correction is conventionally achieved at 118°±45°, i.e., at 73° and 163° to correct the yellow-green and red-violet hues. The maximum correction is typically limited to 20°, which amounts to demodulating a chrominance subcarrier CHR having a phase $\psi$ of 73° as though it had a phase of 93° and a subcarrier CHR having a phase $\psi$ of 163° as though it had a phase of 143°. For the yellow-green and red-violet hues, this amounts to making the hues more red, to attenuate defects in the rendering of the color (or tones) corresponding to facial skin, which would otherwise make faces appear excessively green or blue. The flesh tones (118°) is not modified.

The demodulation of television signals according to the NTSC standard is carried out by multiplying the chrominance subcarrier CHR, whose phase $\psi$ varies as a function of the color to be restored, by two vectors, at 0° and 90° (or 104°), respectively. The demodulated parameters B-Y and R-Y which are obtained for a predetermined phase $\psi$ are then B-Y=Acos ($\psi$) and R-Y=Acos($\psi$−90°), where A is the modulation amplitude of the chrominance subcarrier CHR. In the case of demodulation by a vector at 104°, R-Y=Acos ($\psi$−104°).

Colors are generally corrected by modifying the phase of the two demodulation vectors by an angle $\theta$ corresponding to the correction to be made to phase $\psi$ of the chrominance subcarrier CHR. Thus, the chrominance subcarrier CHR is demodulated by multiplying it by vectors, at $\theta$ and $\theta$+90°, respectively.

Parameters R-Y and B-Y then become R-Y=Acos(($\psi$−$\theta$)−90° and B-Y=Acos($\psi$−$\theta$).

FIG. 2 represents a diagram of a conventional demodulator of chrominance information of a television signal, according to NTSC standard.

The chrominance subcarrier CHR, having a phase $\psi$ which varies as a function of the color, is provided to a demodulator (DEMOD) 1 which restores parameters B-Y and R-Y. Demodulator 1 receives, as a demodulation vector, two signals $f_B$ and $f_R$ which, in the absence of correction, have a phase 0° and 90° (or 104°), respectively. Signals $f_B$ and $f_R$ are generated by a phase-locked loop (PLL) including a voltage-controlled oscillator (VCO) 2, a resistive and capacitive network or RC network 3 and a phase comparator (COMP) 4. The VCO 2 receives a reference frequency $f_{ref}$ from a quartz crystal 5 and a phase error signal e provided by comparator 4. Signal Svco, delivered by the VCO 2, is provided to a constant phase shifter (HUE) 6 controlled by signal $E_6$. The role of the phase shifter 6 will be explained further below.

The output $S_6$ of the phase shifter 6 is provided, through an adder 7 whose role will be described below, to an RC network 3 which provides two output signals, $f_B$ and $f'_R$, respectively. Signal $f_B$ constitutes the first demodulation vector of the subcarrier CHR. Signal $f_R$ is provided to the phase comparator 4 which also receives the subcarrier CHR. Signal $f'_R$ also forms the second vector $f_R$ for demodulating the subcarrier CHR when the red color is at 90°. When the demodulation is at 104°, signal $f'_R$ crosses a 14°-phase shifter 8, which provides vector $f_R$. A switch 9 is generally provided to select signal $f_R$ between the output signal of the RC network 3 and the output of the phase shifter 8. Switch 9 is controlled by a signal Eg provided by means (not shown) as a function of the detection of a demodulation vector (90° or 104°) of parameter R-Y.

At the beginning of each line scan, the PLL is synchronized during a portion of the television signal called a reference burst. Phase shifter 6, adder 7 and the phase comparator 4 are controlled by a binary signal BG indicating the presence of a portion of a reference burst of the line scan during which the phase of the subcarrier CHR is at 180°. This portion of the scan is usually referred to as the burst gate BG. During the burst gate BG, the phase shifter 6 and adder 7 are disabled so that signal $S_7$ at the output of adder 7 corresponds to signal Svco. In contrast, the phase comparator 4 is enabled during the burst gate BG. Thus, the VCO 2 is servo-controlled when the phase of signal $f'_R$ from the RC network 3 is at 90° with respect to subcarrier CHR. When the loop is locked, signal Svco at the output of VCO 2 has, for example, a phase of 118°. In practice, comparator 4 is enabled by signal BG and the phase shifter 6 and adder 7 are enabled by the complement $\overline{BG}$ of signal Svco At the end of the burst gate BG, the phase comparator 4 is disabled and the phase shifter 6 and adder 7 are enabled. The phase shifter 6 is designed to provide, outside the reference bursts, a constant phase shift which is generally selected between +30° and −30°, to compensate for a phase shift which is frequently present between the reference burst and the subcarrier encoding colors at the transmission. This phase shift is constant for a predetermined channel and the phase shifter 6 is disabled during the gate burst BG in order to avoid changing the phase lock. Adder 7 is designed to add, when the phase of the subcarrier ranges from 28° to 208°, signal Svco (forced to 118°), and a portion of the chrominance subcarrier CHR. The amplitude of signal $S_7$ is maximum for a subcarrier CHR having a phase of 118°. The phase shift between signals $S_6$ and $S_7$ is maximum for a subcarrier CHR having a phase of 73° or 163°.

Hence, with respect to signal Svco, signal $S_7$ that is transmitted to the RC network 3 has a reduced phase shift with respect to the phase shift of the subcarrier CHR when the phase of the latter ranges from 28° to 208°. The phases of signals $f_B$ and $f_R$ follow the phase rotation of signal $S_7$ with respect to signal Svco. Therefore, the subcarrier CHR is demodulated as though the difference in phase of the subcarrier and 118° were reduced. The tones of color near the flesh tones are thus restored closer to the true flesh tones of 118°.

The PLL maintains the output phases of the RC network at 0° and 90°. For a predetermined frequency, for example 3.58 MHz, the values of the RC network 3 force the incoming phase to 118° during the gate burst BG. The RC network 3 is thus sized for a predetermined NTSC standard (3.58 MHz or 4.43 MHz).

A drawback of a conventional circuit as represented in FIG. 2 is that, since the subcarrier's amplitude is demodulated, the phase correction obtained by addition of vectors depends not only upon the phase information, but also upon the luminance information. Thus, color correction may vary over different luminance values.

It could be possible to avoid this drawback by limiting (saturating) the amplitude of the chrominance subcarrier CHR. However, this causes a distortion of signal CHR away from a sinusoidal wave form. Adding signal CHR to signal $S_6$ would then provide a less accurate result; in addition, signal $S_7$ is distorted due to the addition of the two signals which are not both sinusoidal. The distortion of the signal provided to the RC network 3 prevents signals R-Y and B-Y from corresponding to an accurate phase shift of 90° because the input signal should be sinusoidal to obtain a phase shift of 90° at the output of the RC network 3.

A further problem results from the manufacturing tolerances for the RC network 3. The relative manufacturing accuracy of such a network is generally approximately ±15%. The manufacturing tolerances of the RC network cause a shift of the 118°-reference phase, which could cause the color corrections to be more detrimental than the color difference to be corrected.

Document DE-B-1 278 492 describes a circuit for correcting the color in a PAL standard television signal, which adds to the chrominance signal, a correction signal obtained from two demodulation signals phase-shifted by 90° one with respect to the other. The phase rotation of the demodulation signals is achieved independently of the phase of the chrominance subcarrier and is thus the same for each color. This circuit uses adders and multipliers for adding to each demodulation signal a fraction of the other signal.

Document U.S. Pat. No. 4,173,770 also describes a circuit for globally adjusting colors by modifying, in a constant manner for all the colors, the phase of the chrominance subcarrier.

SUMMARY OF THE INVENTION

An object of the present invention is to avoid the drawbacks of conventional color correction devices by providing a device enabling to obtain phase references which are less sensitive to the manufacturing tolerances of RC networks.

A further object of the present invention is to make the color correction independent of the amplitude saturation of the chrominance subcarrier.

To achieve these objects, one embodiment of the present invention provides a device for correcting the chrominance parameters transmitted by a chrominance subcarrier of a television signal, by shifting the phase of two demodulation signals the same angle, which depends upon the phase of the chrominance subcarrier. The demodulation signals are obtained from a phase-locked loop including a resistive and capacitive network having two outputs that differ by 90° with respect to each other. The device includes two adders, each receiving, at a first input, one of said signals provided by the RC network and, at the second input, a signal representing a fraction of the other signal provided by the RC network, each adder providing one of said demodulation signals; two multiplying units respectively associated to said adders and delivering, each, one of said signals of the RC network affected by a respective fractional coefficient, the fractional coefficients being opposite to each other; and a unit for controlling said multiplying units and providing, as a function of the phase of the chrominance subcarrier, at least one reference value representative of said fractional coefficients.

According to an embodiment of the present invention, each multiplying unit is formed by an inverter for inverting the signal provided by the RC network and a multiplier for multiplying the output signal of the inverter. The inverter and the multiplier are controlled by signals representative of the fractional coefficient to be applied and which are provided by the control unit.

According to an embodiment of the present invention, the control unit includes two multipliers for multiplying the chrominance subcarrier by a phase reference which corresponds to a central phase of an angular correction range (e.g. 118°) and by a phase reference corresponding to an extreme phase of the angular range nearest to 0° (e.g. 28°), respectively.

According to an embodiment of the present invention, the multiplier by the central reference phase provides the signal controlling the inverters. The multiplier by the extreme phase reference provides the control signal of the multipliers of the multipliers.

According to an embodiment of the present invention, the control unit includes means for generating, from the signals generated by the RC network, the phase references.

According to an embodiment of the present invention, the RC network receives a signal whose phase is constant.

According to an embodiment of the present invention, the signal transmitted to the RC network is provided by a voltage-controlled oscillator of the phase-locked loop which is enabled during a portion of the television signal during which the phase of the chrominance subcarrier is zero.

According to an embodiment of the present invention, the output signals of the RC network have a limited amplitude and are filtered.

The foregoing and other objects, features, aspects and advantages of the invention will become apparent from the following detailed description of the present invention when taken in connection with the accompanying drawings.

BRIEF DESCRIPTION OF THE DRAWINGS

For the sake of clarity the same elements are designated with the same references in the various drawings.

DETAILED DESCRIPTION

Figure 3:
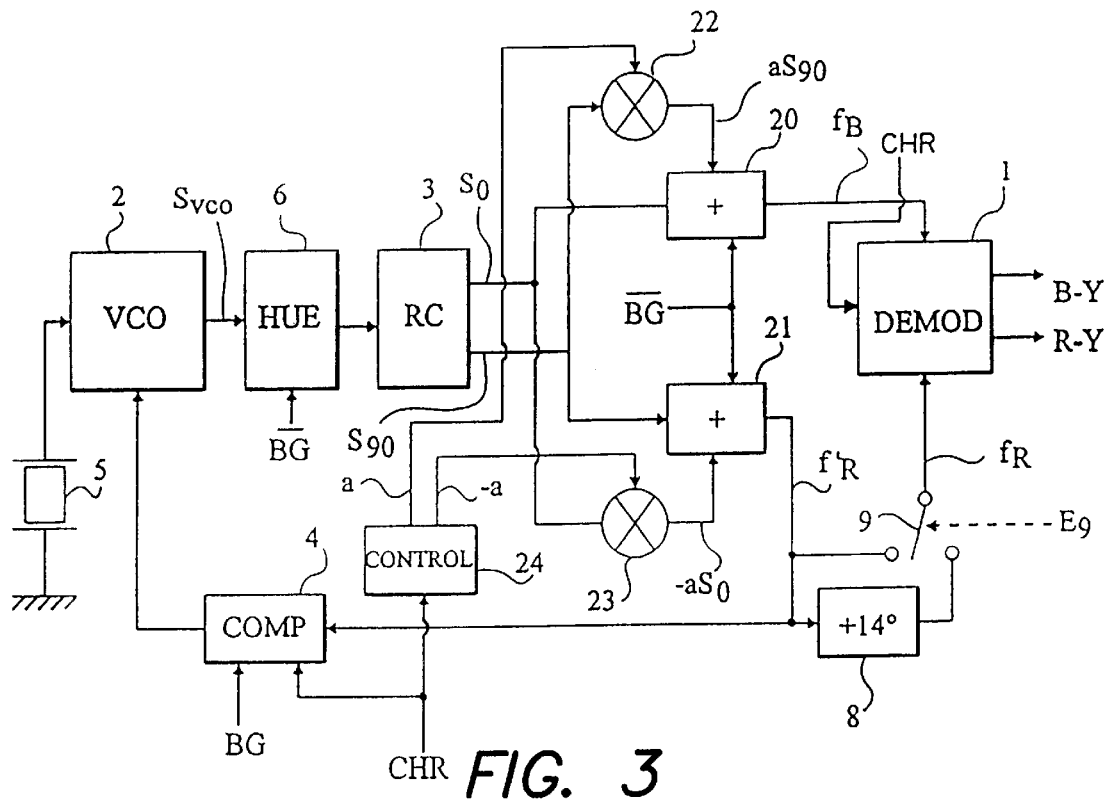
FIG. 3 shows a block diagram of an embodiment of a hue correction device according to the present invention.

FIG. 3 illustrates an embodiment of a color correction device according to the invention.

Figure 1:
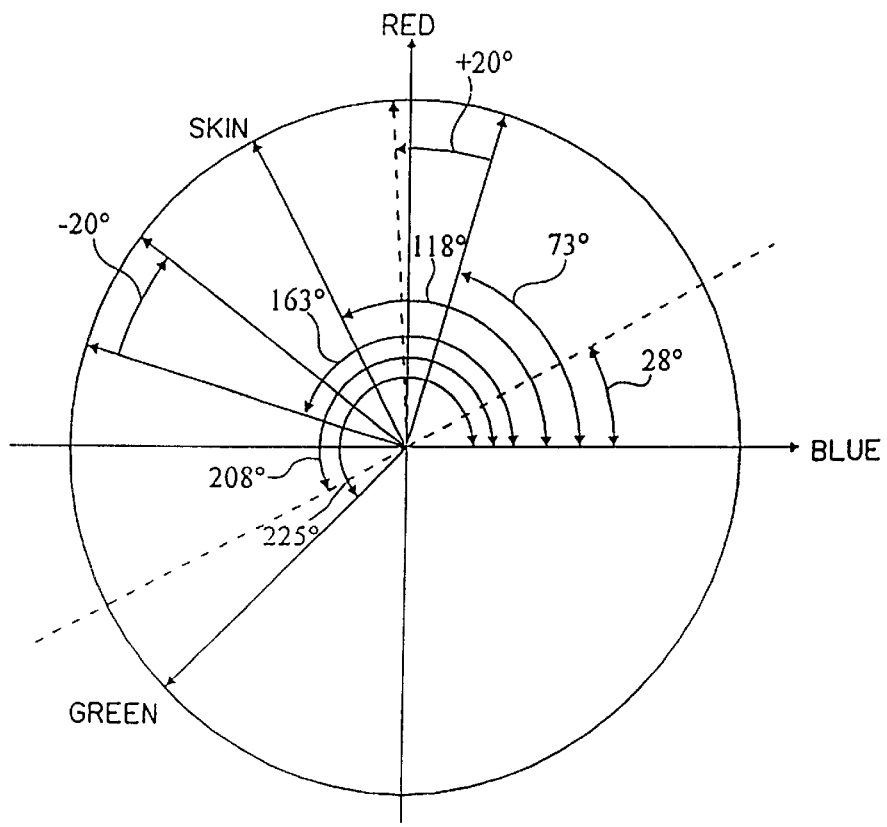
FIGS. 1 and 2, above described, explain the state of the art and related problems.
Figure 2:
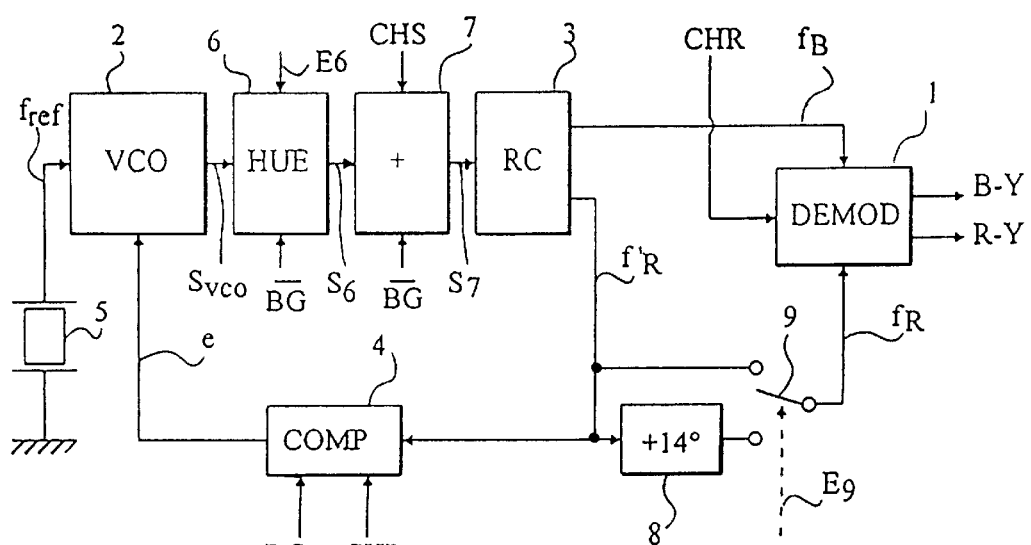

As above, the correction device includes a demodulator 1 which receives two demodulation vectors $f_B$ and $f_R$, differing by 90° (or 104°) with respect to each other. The selection between a phase shift of 90° or 104° is conventionally made by a switch 9 and a 14°-phase shifter 8. The correction device includes a VCO 2 associated with a constant phase shifter (HUE) 6, an RC network 3 and a quartz crystal 5 providing a sampling reference $f_{ref}$ of an error signal e provided by a phase comparator 4. The operation of the phase comparator 4 is the same as that described with relation to FIG. 2. In other words, comparator 4 is enabled during the burst gate BG of the reference burst of the television signal and receives signal $f'_R$ at 90° provided by the RC network 3. Hence, signal Svco has, as above, a phase determined by the values of the RC network 3, for example, a phase of 45°.

A distinctive feature of one embodiment of the present invention is that the phase of signal Svco is not modified outside the burst gate BG. In other words, the RC network 3 is sized so that the phase of signal Svco, is, for example, 45° or 135° outside the burst gate BG, i.e., when the phase shifter 6 is disabled. The correction is still achieved by a phase rotation of the demodulation vectors $f_B$ and $f_R$. However, this rotation is, according to the invention, achieved downstream from the RC network 3. Instead of adjusting the signal provided by the VCO 2 to a phase of 118°, the phases of the demodulation vectors $f_B$ and $f_R$ are directly adjusted.

For this purpose, the outputs $S_0$ and $S_{90}$ of the RC network 3 are provided to one input of adders 20 and 21 respectively. A second input of each adder, 20 or 21, respectively, receives the other output $S_{90}$ or $S_0$, respectively, of the RC network 3, affected by a fractional coefficient a or its opposite −a, as shown. Signal $S_{90}$ is provided to a multiplying unit 22 which also receives the fractional coefficient a and which provides a signal $aS_{90}$ to adder 20. Signal $S_0$ is provided to a multiplying unit 23 which also receives the opposite of a, positive or negative, and which provides a signal $-aS_0$ to adder 21. The control signals a and −a of the multiplying units 22 and 23, respectively, are provided by a unit 24 which controls the correction device according to one embodiment of the invention. The control unit 24 has the role of calculating coefficients a and −a, as a function of the phase ψ of the chrominance subcarrier CHR. For this purpose, unit 24 may use reference phases at 28° and 118° (not shown in FIG. 3) that are generated by unit 24 from signals $S_0$ and $S_{90}$, as will be explained in greater detail in relation to FIG. 4.

The outputs of adders 20 and 21 provide the demodulation signals $f_B$ and $f_R$, respectively, differing by 90° with respect to each other. Adders 20 and 21, according to an embodiment of the invention, are designed to add, to each signal $S_0$ and $S_{90}$ provided by the RC network 3, a positive or negative portion of the other signal. Assuming that the vectors of $S_0$ and $S_{90}$ have the same amplitude, this causes the phases of signals $S_0$ and $S_{90}$ to be shifted by a same angle θ. The value of angle θ depends upon the fractional coefficients a and −a, which are between −1 and 1.

Indeed, the vector of angle θ corresponds to the sum of the vector of angle 0° and of the product of coefficient a and the vector of angle 90°. The vector of angle θ+90° corresponds to the difference between the vector of angle 90° and the product of the vector of angle 0° and the coefficient a, i.e., to the sum of the vector of angle 90° and the product of the opposite of coefficient a (−a) by the vector of angle 0°.

For example, to achieve a phase rotation of θ=20°, assuming that signals $S_0$ and $S_{90}$ have the same amplitude, the other signal $S_{90}$ or $S_0$, respectively, multiplied by a coefficient of approximately 0.36 and −0.36, respectively, is added to each signal $S_0$ and $S_{90}$. To achieve a phase rotation of θ=−20°, for example, the other signal $S_{90}$ or $S_0$, respectively, multiplied by a coefficient of approximately −0.36 and 0.36, respectively, is added to each signal $S_0$ or $S_{90}$, respectively.

The amplitude variation caused by adders 20 and 21 is not detrimental since the amplitude of the demodulation vectors $f_B$ and $f_R$ may be subsequently limited in demodulator 1.

Signal Svoo may need to be locked, for example to a phase of 45°, during the burst gate BG. For this purpose, the output of adder 21 is provided to the phase comparator 4. Adder 21 is enabled by the complement $\overline{BG}$ of the burst gate BG so as to be disabled during the burst gate BG. The same is true for adder 20 if the portion of the reference burst of the scan line, during which the phase ψ of the subcarrier CHR is at 180°, is used by other circuits of the television receiver, for example, circuits for identifying standards (PAL or NTSC) based on the phase of the reference burst.

Since the relative amplitude of signals $S_0$ and $S_{90}$ may vary with respect to each other, due to manufacturing tolerances of the RC network 3, each output signal $S_0$ and $S_{90}$ of the RC network 3 may cross a limiter (not shown) followed by two filters of the first order (not shown). The limitation of the amplitude of signals $S_0$ and $S_{90}$ and the filtering thereof are possible in this case if signals $S_0$ and $S_{90}$ constantly have the same nominal phase (0° and 90°, respectively). The first filter is, for example, an RC filter and the second filter is, for example, a current mirror filter. Thus, the relative amplitude variation is reduced between the two signals to approximately 4%. The residual 4% distortion leaves the signals sufficiently close to sinusoidal to subsequently achieve vector additions.

Figure 4:
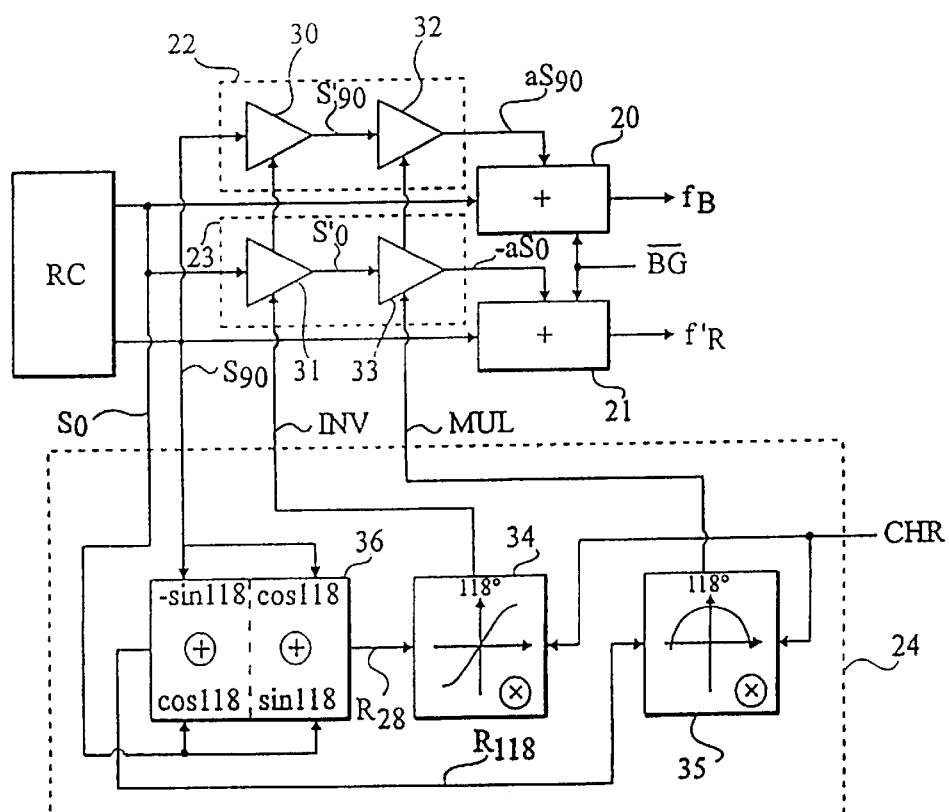
FIG. 4 shows an embodiment of control and multiplying units for a correction device according to the present invention.

FIG. 4 shows an embodiment of a control unit 24 and multiplying units 22 and 23. FIG. 4 only shows the RC network 3, adders 20 and 21, the multiplying units 22 and 23 and the control unit 24. The other components of the correction device are the same as those disclosed with relation to FIG. 3.

The fraction $-aS_0$ and $aS_{90}$ of each signal $S_0$ or $S_{90}$ to be added to signal $S_{90}$ or $S_0$ respectively, is obtained through an inverter (or multiplier) 30 and 31, respectively, and a multiplier 32 and 33, respectively. Inverters 30 and 31 are designed to take the inverse of signals $S_{90}$ and $S_0$, respectively. Multipliers 32 and 33 are used to attenuate the amplitude of the signal, $S'_{90}$ or $S'_0$, respectively, provided by inverters 30 and 31, respectively, by multiplying signal $S'_{90}$ or $S'_0$ by coefficient a.

Inverters 30 and 31 and multipliers 32 and 33 may be controlled by unit 24 which provides, as a function of the phase of the chrominance subcarrier CHR, a signal INV for enabling the inversion of signals $S_0$ and $S_{90}$. Unit 24 also provides a signal MUL representative of the fractional coefficient a. In other words, signal INV cancels, depending upon its sign, the inversion of signals $S_0$ and $S_{90}$, and signal MUL attenuates signals $S'_0$ and $S'_{90}$ by an always positive coefficient within the correction range of 118°±90°.

According to the embodiment of unit 24 as shown in FIG. 4, inverters 30 and 31 are in fact multiplier-inverters. The control signal INV corresponds to a fractional coefficient ranging from −1 to +1. Signal MUL corresponds to a fractional coefficient ranging from 0 to +1. The product of signals INV and MUL corresponds to the opposite of coefficient a (that is, −a).

In the embodiment of FIG. 4, each signal INV and MUL is provided by multipliers 34 and 35, respectively, of the chrominance subcarrier CHR by a phase reference $R_{28}$ at 28° or $R_{118}$ at 118°, respectively.

The result of the multiplication, in multiplier 34, of signal $R_{28}$ by signal CHR is the cosine of the difference between phase $\psi$ of signal CHR and 28° (or the sine of the difference between 118° and phase $\psi$ of signal CHR). Thus, for phases $\psi$ of signal CHR ranging from 118° to 298°, i.e., 208±90°, signal INV is negative (between −1 and 0). For phases $\psi$ lower than 118° or higher than 258°, i.e., 28±90°, signal INV is positive (between 0 and 1).

The result of the multiplication, in multiplier 35, of signal $R_{118}$ by signal CHR is the cosine of the difference between phase $\psi$ of signal CHR and 118° (or the sine of the difference between phase $\psi$ of signal CHR and 28°). Thus, for phases $\psi$ of signal CHR ranging from 28° to 208°, i.e., 118°±90°, signal MUL is positive (between 0 and 1). For phases $\psi$ lower than 28° or higher than 208°, i.e., within the angular range 298°±90°, the result of the multiplication is negative (between −1 and 0).

In order to not correct the hues outside the angular range of 118°±90°, the output signal MUL of multiplier 35 may have a minimum offset below which signal MUL is zero. The offset cancels the phase rotation if the phase $\psi$ of the chrominance subcarrier CHR is outside the angular range 118°±90°. Indeed a zero signal MUL cancels the output signals of inverters 30 and 31. As a result, no fraction of signals $S_{90}$ and $S_0$, respectively, is added to signals $S_0$ and $S_{90}$, respectively. The offset of the output signal MUL of multiplier 35 is very simple to set, for an angular range of ±90°, since the offset is then zero. Indeed, it is sufficient to transmit to multipliers 32 and 33 only the positive MUL signals to account only for the phases $\psi$ of the chrominance subcarrier CHR within the angular range 118°±90°. Thus, for phases $\psi$ of signal CHR within the range 298°±90° where the result of the multiplication by reference $R_{118}$ is negative, signal MUL is zero.

The amplitude of the chrominance signal CHR is limited in multipliers 34 and 35. Thus, signals INV and MUL do not change with variation of the amplitude of signal CHR. The distortion generated by this amplitude limitation has no effect because only the d.c. component of the result of the multiplication is used; it is no longer a vector addition. Preferably, the output of each multiplier 34 and 35 is filtered to eliminate the signal which has twice the frequency of the subcarrier and which forms a residue of the multiplication.

Preferably, each adder 20 or 21 includes an input stage formed by a fixed-gain amplifier (not shown). The amplifier is designed to enable the adjustment of the amplitude of the phase shift by amplifying (or attenuating) coefficient a. Preferably, the respective amplifiers of the adders have the same gain. For example, the gain of the input amplifiers of adders 20 and 21 may be adjusted in order to obtain an amplitude of the phase shift of ±20°.

Similarly, the correction range of ±90° from 118° can, according to the invention, be adjusted by modifying the offset of multiplier 35. For example, the correction range can be fixed to ±60° from 118°.

It should be remarked, in an alternative embodiment, that the fixed-gain amplifiers for adjusting the amplitude of the phase shift can be formed by input amplifiers of inverters 30 and 31, respectively.

Figure 5A:
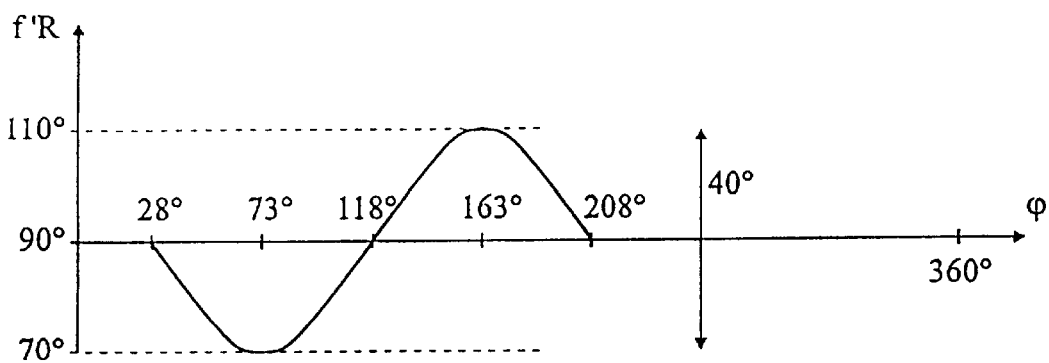
FIGS. 5A and 5B show phase characteristics of the demodulation signals as a function of the phase of the chrominance subcarrier in a device according to one embodiment of the invention as shown in FIG. 3.
Figure 5B:
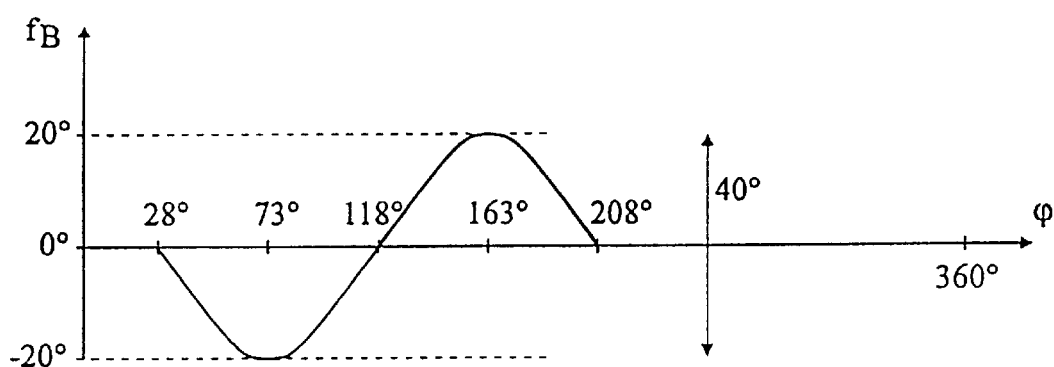

FIGS. 5A and 5B represent the characteristics of the phase of signals $f_B$ and $f_R$ as a function of phase $\psi$ of the chrominance subcarrier CHR for one embodiment of the invention. For the sake of clarity, the characteristics are not drawn to scale. It is assumed that the correction range is fixed to ±90° and that the amplitude of the phase shift is limited to ±20°.

For a signal CHR having a phase $\psi$ of 118° (flesh tone), signal INV is zero and signal MUL is maximum (equal to 1). Therefore, inverters 30 and 31 cancel signals $S_{90}$ and $S_0$, respectively, that they receive. Thus, no shift is introduced into signals $S_0$ and $S_{90}$, respectively, and no correction of the skin hue is made.

For a signal CHR having a phase $\psi$ of 73°, signals INV and MUL are both approximately 0.71. Since signals $S'_{90}$ and $S_0$, provided by inverters 30 and 31, respectively, correspond to the inverse of signals $S_{90}$ and $S_0$, respectively, multiplied by signal INV, the multiplying units 22 and 23 in fact multiply signals $S_{90}$ and $S_0$, respectively, by a coefficient a approximately equal to −0.50. Because of the presence of the fixed-gain amplifiers, this amounts to multiplying by a coefficient of approximately −0.36. Signals $S_0$ and $S_{90}$ are therefore shifted by approximately −20° with respect to 0° and 90°, respectively. Signal CHR is then demodulated as though it had a phase of approximately 93°.

For a signal CHR having a phase $\psi$ of 163°, signals INV and MUL are approximately −0.71 and 0.71, respectively. Because of the inversion achieved by inverters 30 and 31, the multiplying units 22 and 23 in fact multiply signals $S_{90}$ and $S_0$, respectively, by a coefficient a of approximately 0.50. Because of the adjustment achieved by the fixed-gain amplifiers, this amounts to multiplying by a coefficient of approximately 0.36. Thus, signals $S_0$ and $S_{90}$ are shifted by approximately 20° with respect to 0° and 90°, respectively. Signal CHR is then demodulated as though it had a phase of 143°.

For a signal CHR having a phase $\psi$ of 208°, signal INV is minimum (equal to −1) and signal MUL is zero. Hence, multipliers 32 and 33 cancel the output signals of the inverters (multipliers) 30 and 31. Thus, no phase shift is introduced into signals $S_0$ and $S_{90}$, respectively, and no hue correction is made. The result is the same for a signal CHR having a phase $\psi$ of 28°, signal MUL being zero and signal INV being maximum (equal to 1).

A signal CHR having a phase $\psi$ lower than 28° or higher than 208° is not corrected since signal MUL is zero.

The phase references $R_{28}$ at 28° and $R_{118}$ at 118° are, according to one embodiment of the invention, obtained from signals $S_0$ and $S_{90}$. For this purpose, unit 24 includes a double adder 36 for adding signals $S_0$ and $S_{90}$, respectively, affected by multiplication coefficients sin (118°) and cos(118°), respectively, for the phase reference $R_{28}$ and cos(118°) and sin(118°) for the phase reference R118.

Figure 6A:
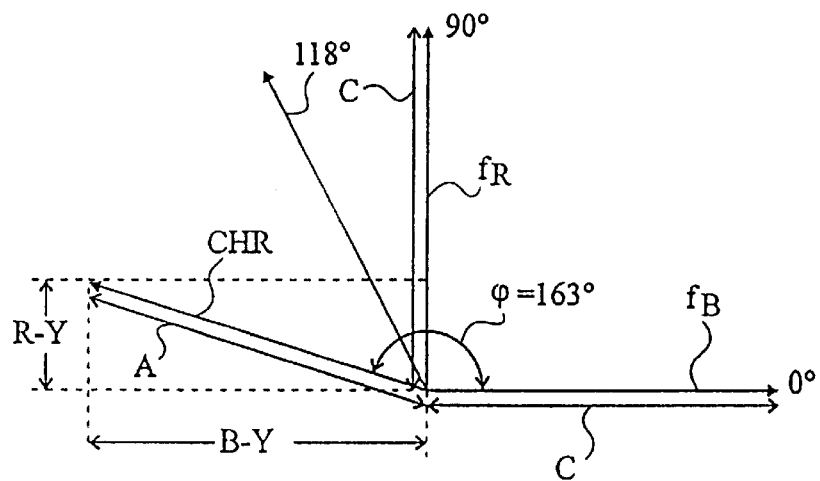
FIGS. 6A and 6B are phase diagrams illustrating the effect of the correction made by a device according to one embodiment of the invention as shown in FIG. 3.
Figure 6B:
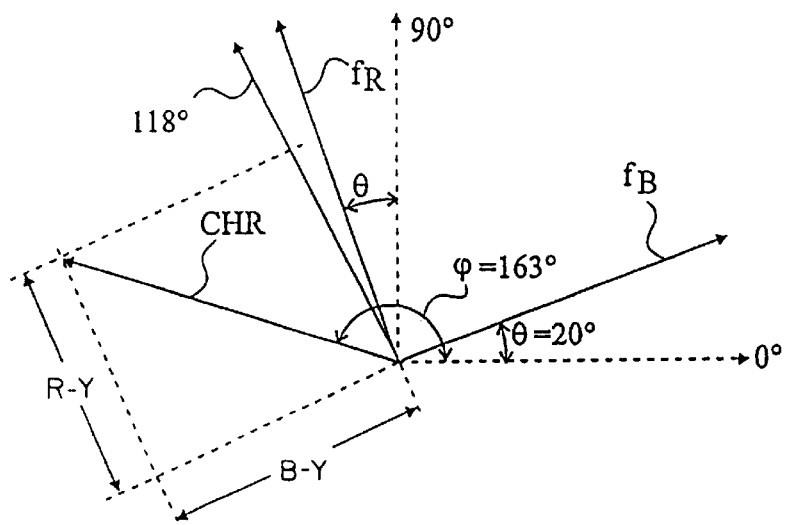

FIGS. 6A and 6B illustrate, by way of example, the variations of parameters R-Y and B-Y obtained by demodulation with or without color correction, respectively, for a chrominance subcarrier CHR having a phase ψ of 163°. It is assumed that demodulation is achieved at 90°, i.e., that signal $f_R$ corresponds to signal $f'_R$.

A is the amplitude of the chrominance subcarrier CHR and D is the amplitude of the demodulation signals $f_B$ and $f_R$.

In the absence of hue correction (FIG. 6A), the result of the demodulation achieved by demodulator 1 provides the following parameters B-Y and R-Y:

B-Y=ADcos(163°)=−0.96 AD; and

R-Y=ADcos(163°90°)=0.29 AD.

When a color is corrected by the device according to an embodiment of the invention, the phases of signals $f_B$ and $f_R$ are approximately 20° and 110°, respectively. Thus:

B-Y=ADcos(163°−20°)=−0.80 AD; and

R-Y=ADcos(163°−110°)=0.60 AD.

The demodulation of the flesh tone at 118° which is not corrected is:

B-Y=ADcos(118°)=−0.47 AD; and

R-Y=Adcos(118°−90°)=0.88 AD.

It may be noted that parameters B-Y and R-Y are closer to those of the flesh tone when the green-yellow tone is corrected.

It should be remarked that, according to one embodiment of the invention, all the operations made on signal CHR are achieved from signals which are all generated only by signals $S_0$ and $S_{90}$ provided by the RC network 3.

Of course, as is apparent to those skilled in the art, various modifications can be made to the above embodiments. For example, each of the elements above described may be replaced with one of more elements performing the same function.

In addition, although the above description referred to a correction within the angular range of ±90° about 118°, the invention also applies independently of the phase on which the half-planes of the correction phases is centered. In addition, the adaptation to another half-plane of phases is very simple. It is sufficient to modify, in the double adder 36 used to generate the reference phases, the multiplication coefficients (cos(118°), sin(118°) and −sin(118°)) of the signals received by adder 36 as a function of the phase on which the half-plane of the selected phases is centered. The phase reference used by multiplier 35 corresponds to the central phase of the desired half-plane of the correction phases. The phase reference used in multiplier 34 corresponds to the extreme phase nearest to 0° of the phase half-plane. Similarly, the correction range and amplitude of the phase shift can be modified as a function of the desired characteristics for the correction device.

Although the above description only referred to a 0° position for the blue color to simplify the disclosure of the present invention, blue is generally at a negative phase position of −17°. This need not modify implementation of a device according to the present invention.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A device for correcting an R-Y chrominance parameter and a B-Y chrominance parameter transmitted by a chrominance subcarrier of a television signal by producing a B demodulation signal and an R demodulation signal produced by shifting an S0 signal and an S90 signal, respectively, a phase shift amount which depends on the phase of the chrominance subcarrier, the S0 signal and the S90 signal being obtained from a phase locked loop including an RC network, the S0 signal and the S90 signal differing in phase by about ninety degrees, the device comprising:

a first multiplying unit, having an output, to multiply the S90 signal by a first fraction;

a first adder having a first input to receive the S0 signal, a second input coupled to the first multiplying unit output and an output to provide the B demodulation signal;

a second multiplying unit, having an output, to multiply the S0 signal by a second fraction, the second fraction being equal in magnitude and opposite in sign to the first fraction;

a second adder having a first input to receive the S90 signal, a second input coupled to the second multiplying unit output and an output to provide the R demodulation signal; and a control unit, coupled to the first multiplying unit and the second multiplying unit, to provide at least one reference value corresponding to the value of the first fraction and the second fraction.

2. The correction device of claim 1, wherein:

the control unit includes a first output to provide the at least one reference value and a second output to provide a signal to control the first multiplying unit and the second multiplying unit;

the first multiplying unit comprises a first inverter having a first input to receive the S90 signal, a second input coupled to the second control unit output and an output, and a first multiplier having a first input coupled to the first inverter output, a second input coupled to the first control unit output and an output; and the second multiplying unit comprises:

a second inverter having a first input to receive the S0 signal, a second input coupled to the second control unit output and an output, and a second multiplier having a first input coupled to the second inverter output, a second input coupled to the first control unit output and an output.

3. The correction device of claim 2, wherein the control unit includes:

a third multiplier for multiplying the chrominance subcarrier by a first phase reference, the first phase reference corresponding to a central phase of an angular correction range for the chrominance subcarrier; and a fourth multiplier for multiplying the chrominance subcarrier by a second phase reference, the second phase reference corresponding to the phase of the angular correction range closest to zero degrees.

4. The correction device of claim 3, wherein the third multiplier has an output coupled to the second input of the first inverter and to the second input of the second inverter for controlling each, and the fourth multiplier has an output coupled to the second input of the first multiplier and the second input of the second multiplier.

5. The correction device of claim 3, wherein the control unit includes means for generating, from the S0 signal and the S90 signal, the first phase reference and the second phase reference.

6. The correction device of claim 1, wherein the phase locked loop includes a circuit to generate a source reference signal having a constant phase for input to the RC network.

7. The correction device of claim 6, wherein the phase locked loop includes a voltage controlled oscillator which provides the source reference signal, the voltage controlled oscillator being controlled during a portion of the television signal during which the phase of the chrominance subcarrier is zero.

8. The correction device of claim 1, wherein the S0 signal and the S90 signal have a limited amplitude and are filtered.

9. A circuit to restore an R chrominance parameter and a B chrominance parameter from a television signal, comprising:
   a first node to receive an R reference signal;
   a second node to receive a B reference signal;
   a phase shift circuit, coupled to the first node and the second node and responsive to the phase of the television signal, to add a fraction of the B reference signal to the R reference signal to shift the phase of the R reference signal a phase shift amount to produce an adjusted R reference signal, and to add a fraction of the R reference signal to the B reference signal to produce an adjusted B reference signal; and
   a demodulator, having a first input to receive the television signal, a second input to receive the adjusted R reference signal and a third input to receive the adjusted B reference signal, to decode the television signal into the R chrominance parameter and the B chrominance parameter.

10. The circuit of claim 9, wherein the phase shift circuit comprises a circuit to shift the phase of the R reference signal the phase shift amount, the magnitude of the phase shift amount not varying significantly in response to variations in an amplitude of the television signal.

11. The circuit of claim 10, wherein the phase shift circuit comprises a circuit to shift the B reference signal the phase shift amount to produce the adjusted B reference signal.

12. The circuit of claim 9, wherein the phase shift circuit comprises:
   a control unit, having a first control unit output, responsive to the phase of the television signal, to generate a first coefficient on the first control unit output;
   a first multiplier circuit having a first input coupled to the first control unit output, a second input coupled to the second node, and an output; and
   a first adder having a first input coupled to the first multiplier circuit output, a second input coupled to the first node, and an output.

13. The circuit of claim 12, wherein the phase shift circuit comprises a circuit to shift the phase of the R reference signal the phase shift amount, the magnitude of the phase shift amount not varying significantly in response to variations in an amplitude of the television signal, and a circuit to shift the B reference signal the phase shift amount.

14. The circuit of claim 12, wherein the phase shift circuit further comprises:
   means for limiting the phase shift amount to about zero degrees when the phase of the television signal is within a first selected range; and
   means for limiting the phase shift amount to remain within a second selected range.

15. The circuit of claim 12, wherein the control unit includes a circuit to generate a second coefficient on a second control unit output; and
   the phase shift circuit further comprises a second multiplier circuit having a first input coupled to the second control unit output, a second input coupled to the first node, and an output, and
   a second adder having a first input coupled to the second multiplier circuit output, a second input coupled to the second node, and an output.

16. The circuit of claim 15, wherein the control unit further comprises:
   a third multiplier circuit having a first input to receive a first target reference phase signal, a second input to receive the television signal, and an output to provide the first coefficient;
   a fourth multiplier circuit having a first input to receive a second target reference phase signal, a second input to receive the television signal, and an output to provide the second coefficient;
   a fifth multiplier circuit having a first input to receive the first coefficient, a second input to receive the second coefficient, and an output to provide the first control unit output; and
   means for determining the second control unit output by reversing the sign of the first control unit output.

17. The circuit of claim 15, wherein the control unit comprises a circuit to produce the first coefficient and the second coefficient having the same magnitude.

18. The circuit of claim 12, wherein the phase shift circuit further comprises:
   a second multiplier circuit having a first input coupled to the first control unit output, a second input coupled to the first node, and an output; and
   a second adder having a first input coupled to the second multiplier circuit output, a second input coupled to the second node, and an output.

19. The circuit of claim 18, wherein one of the first multiplier circuit and the second multiplier circuit includes a circuit to invert the result of multiplying the first input and the second input of the one of the first multiplier circuit and the second multiplier circuit.

20. The circuit of claim 12, wherein
   the control unit includes a second control unit output and a circuit to generate a second coefficient on the second control unit output;
   the first multiplier circuit has a third input coupled to the second control unit output; and
   the phase shift circuit further comprises
   a second multiplier circuit having a first input coupled to the first control unit output, a second input coupled to the second control unit output, a third input coupled to the first node, and an output; and
   a second adder having a first input coupled to the second multiplier circuit output, a second input coupled to the second node, and an output.

21. The circuit of claim 20, wherein one of the first multiplier circuit and the second multiplier circuit includes a circuit to invert the result of multiplying the first input, the second input and the third input of the one of the first multiplier circuit and the second multiplier circuit.

22. The circuit of claim 20, wherein the control unit further comprises:
   a third multiplier circuit having a first input to receive a first target reference phase signal, a second input to receive the television signal, and an output to provide the first control unit output; and
   a fourth multiplier circuit having a first input to receive a second target reference phase signal, a second input to receive the television signal, and an output to provide the second control unit output.

23. The circuit of claim 22, wherein the control unit comprises a circuit to produce at least one of the first coefficient signal and the second coefficient signal to be approximately zero when the phase of the television signal is within a selected range.

24. A circuit for correcting and decoding an input signal having a first parameter encoded with respect to a first reference phase and a second parameter encoded with respect to a second reference phase, comprising:
    a generation circuit to generate a first reference signal and a second reference signal;
    a phase shift circuit, coupled to the first reference signal and the second reference signal, and responsive to the phase of the input signal, to add a first fraction of the second reference signal to the first reference signal to shift the phase of the first reference signal a phase shift amount dependent on the phase of the input signal to produce a first adjusted reference signal, and to add a second fraction of the first reference signal to the second reference signal to produce a second adjusted reference signal; and
    a demodulator, having a first input to receive the input signal, a second input to receive the first adjusted reference signal and a third input to receive the second adjusted reference signal, to decode the input signal into the first parameter and the second parameter.

25. The circuit of claim 24, wherein the phase shift circuit comprises a circuit to shift the phase of the first reference signal the phase shift amount, the magnitude of the phase shift amount not varying significantly in response to variations in an amplitude of the input signal.

26. The circuit of claim 25, wherein the phase shift circuit comprises a circuit to add the second fraction of the first reference signal to the second reference signal to produce the second adjusted reference signal shifted from the second reference signal by the phase shift amount.

27. The circuit of claim 24, wherein the phase shift circuit comprises:
    a control unit, having a first control unit output, responsive to the phase of the input signal, to generate a first coefficient on the first control unit output;
    a first multiplier circuit having a first input coupled to the first control unit output, a second input coupled to the second node, and an output; and
    a first adder having a first input coupled to the first multiplier circuit output, a second input coupled to the first node, and an output.

28. The circuit of claim 27, wherein the phase shift circuit includes a circuit to shift the phase of the first reference signal the phase shift amount, the magnitude of the phase shift amount not varying significantly in response to variations in an amplitude of the input signal, and a circuit to add the second fraction of the first reference signal to the second reference signal to produce the second adjusted reference signal shifted from the second reference signal by the phase shift amount.

29. The circuit of claim 27, wherein the phase shift circuit further comprises:
    means for limiting the phase shift amount to about zero degrees when the phase of the input signal is within a first selected range; and
    means for limiting the phase shift amount to remain within a second selected range.

30. The circuit of claim 27, wherein:
    the control unit includes a second control unit output and a circuit to generate a second coefficient on the second control unit output; and
    the phase shift circuit further comprises
        a second multiplier circuit having a first input coupled to the second control unit output, a second input coupled to the first node, and an output, and
        a second adder having a first input coupled to the second multiplier circuit output, a second input coupled to the second node, and an output.

31. The circuit of claim 30, wherein the control unit further comprises:
    a third multiplier circuit having a first input to receive a first target reference phase signal, a second input to receive the input signal, and an output to provide the first coefficient;
    a fourth multiplier circuit having a first input to receive a second target reference phase signal, a second input to receive the input signal, and an output second coefficient signal;
    a fifth multiplier circuit having a first input to receive the first coefficient, a second input to receive the second coefficient, and an output to receive the first control unit output; and
    means for determining the second control unit output by reversing the sign of the first control unit output.

32. The circuit of claim 30, wherein the control unit comprises a circuit to produce the first coefficient and the second coefficient having the same magnitude.

33. The circuit of claim 27, wherein the phase shift circuit further comprises:
    a second multiplier circuit having a first input coupled to the first control unit output, a second input coupled to the first node, and an output; and
    a second adder having a first input coupled to the second multiplier circuit output and a second input coupled to the second node, and an output.

34. The circuit of claim 33, wherein the second multiplier circuit includes a circuit to invert the result of multiplying the first control unit output and the first signal.

35. The circuit of claim 27, wherein
    the control unit includes a second control unit output and a circuit to generate a second coefficient on the second control unit output;
    the first multiplier circuit has a third input coupled to the second control unit output; and
    the phase shift circuit further comprises:
        a second multiplier circuit having a first input coupled to the first control unit output, a second input coupled to the second control unit output, a third input coupled to the first node, and an output; and
        a second adder having a first input coupled to the second multiplier circuit output, a second input coupled to the second node, and an output.

36. The circuit of claim 35, wherein the second multiplier circuit includes a circuit to invert the result of multiplying the first control unit output, the second control unit output and the first signal.

37. The circuit of claim 35, wherein the control unit further comprises:
    a third multiplier circuit having a first input to receive a first target reference phase signal, a second input coupled to the input signal, and an output coupled to the first control unit output; and a fourth multiplier circuit having a first input to receive a second target reference phase signal, a second input coupled to the input signal, and an output coupled to the second control unit output.

38. The circuit of claim 37, wherein the control unit comprises a circuit to produce at least one of the first coefficient and the second coefficient to be approximately zero when the phase of the television signal is within a selected range.

39. The circuit of claim 27, wherein the generation circuit comprises:

a phase locked loop to generate a reference source signal; and an RC network coupled to the reference source signal to produce the first reference signal and the second reference signal.

40. A method for restoring an R chrominance parameter and a B chrominance parameter from a television signal, comprising the steps of:

providing an R reference signal;

providing a B reference signal;

after the step of providing an R reference signal, shifting the phase of the R reference signal an amount responsive to variations in the phase of the television signal to produce an adjusted R reference signal;

after the step of providing a B reference signal, shifting the phase of the B reference signal approximately the amount to produce an adjusted B reference signal; and demodulating the television signal using the adjusted R reference signal and the adjusted B reference signal.

41. The method of claim 40, wherein:

the step of shifting the R reference signal comprises the step of adding a first fraction of the B reference signal to the R reference signal, the magnitude of the fraction varying in response to variations in the phase of the input signal; and the step of shifting the B reference signal comprises the step of adding a second fraction of the R reference signal to the B reference signal.

42. The method of claim 41, wherein the steps of providing an R reference signal and providing a B reference signal comprise the steps of:

generating a source reference signal;

selectively locking the phase of the source reference signal during a reference burst in the television signal; and converting the source reference signal into the R reference signal and the B reference signal.

43. The method of claim 41, wherein the adding the first fraction of the B reference signal step comprises the steps of:

determining a first coefficient;

multiplying the B reference signal by the first coefficient to produce a fractional signal; and adding the fractional signal to the R reference signal.

44. The method of claim 43, wherein the step of determining comprises the steps of:

providing a first reference signal; and multiplying the first reference signal by the input signal to produce the first coefficient.

45. The method of claim 44, wherein the multiplying the B reference signal step comprises the steps of:

providing a second reference signal;

multiplying the second reference signal by the input signal to produce a second coefficient;

multiplying the first coefficient and the second coefficient to produce a combined coefficient; and multiplying the B reference signal by the combined coefficient.

46. The method of claim 44, wherein the multiplying the B reference signal step comprises the steps of:

providing a second reference signal;

multiplying the second reference signal by the input signal to produce a second coefficient;

multiplying the B reference signal by the first coefficient; and multiplying the B reference signal by the second coefficient.

47. A method for adjusting the phase of a first signal, comprising the steps of:

providing a second signal and an input signal; and adding a fraction of the second signal to the first signal, the magnitude of the fraction varying in response to variations in the phase of the input signal;

wherein the adding a fraction step comprises the steps of:

determining a first coefficient;

multiplying the second signal by the first coefficient to produce a fractional signal;

adding the fractional signal to the first signal;

wherein the step of determining comprises the steps of:

providing a first reference signal and a second reference signal;

multiplying the first reference signal by the input signal to produce the first coefficient;

multiplying the second reference signal by the input signal to produce a second coefficient; and wherein the multiplying the second signal step comprises the steps of:

multiplying the first coefficient and the second coefficient to produce a combined coefficient; and multiplying the second signal by the combined coefficient.

48. The method of claim 47, wherein the multiplying the second signal step comprises the steps of:

multiplying the second signal by the first coefficient; and multiplying the second signal by the second coefficient.

49. A circuit for restoring an R chrominance parameter and a B chrominance parameter from a television signal comprising:

means for shifting the phase of an R reference signal an amount in response to variations in the phase of the television signal to produce an adjusted R reference signal;

means for separately shifting the phase of a B reference signal to produce an adjusted B reference signal;

means for demodulating the television signal using the adjusted R reference signal and the adjusted B reference signal;

wherein:

the means for shifting the R reference signal comprises means for adding a first fraction of the B reference signal to the R reference signal, the magnitude of the fraction varying in response to variations in the phase of the input signal; and the means for shifting the B reference signal comprises means for adding a second fraction of the R reference signal to the B reference signal.

50. A circuit for restoring an R chrominance parameter and a B chrominance parameter from a television signal comprising:

means for shifting the phase of an R reference signal an amount in response to variations in the phase of the television signal to produce an adjusted R reference signal;

means for separately shifting the phase of a B reference signal to produce an adjusted B reference signal;

means for demodulating the television signal using the adjusted R reference signal and the adjusted B reference signal;

wherein the means for shifting the B reference signal comprises means for adding the second fraction of the R reference signal to the B reference signal, the second fraction being equal in magnitude to the first fraction.

51. The circuit of claim 49 or 50, further comprising:

means for generating a source reference signal;

phase lock means coupled to the source reference signal and the television signal; and means for converting the source reference signal into the R reference signal and the B reference signal.

52. The circuit of claim 49 or 50, wherein the means for adding a fraction of the R reference signal comprises:

means for determining a first coefficient;

means for multiplying the B reference signal by the first coefficient to produce a fractional signal; and means for adding the fractional signal to the R reference signal.

53. The circuit of claim 52, wherein the means for determining comprises:

means for generating a first reference signal; and means for multiplying the first reference signal by the input signal to produce the first coefficient.

54. The circuit of claim 53, wherein the means for multiplying the B reference signal comprises:

means for multiplying a second reference signal by the input signal to produce a second coefficient;

means for multiplying the first coefficient and the second coefficient to produce a combined coefficient; and means for multiplying the B reference signal by the combined coefficient.

55. The circuit of claim 54, wherein the means for multiplying the B reference signal comprises:

means for multiplying a second reference signal by the input signal to produce a second coefficient;

means for multiplying the B reference signal by the first coefficient; and means for multiplying the B reference signal by the second coefficient.

56. A circuit for adjusting the phase of a first signal, comprising:

means for receiving a second signal and an input signal; and means for adding a fraction of the second signal to the first signal, the magnitude of the fraction varying in response to variations in the phase of the input signal;

wherein the means for adding comprises:

means for determining a first coefficient;

means for multiplying the second signal by the first coefficient to produce a fractional signal;

means for adding the fractional signal to the first signal;

wherein the means for determining comprises:

means for receiving a first reference signal and a second reference signal, means for multiplying the first reference signal by the input signal to produce the first coefficient;

further comprising:

means for converting the first signal and the second signal into the first reference signal.

* * * * *